July 29, 1969 H. F. WILSON 3,458,681
ELECTRIC ARC WELDING APPARATUS AND METHOD
Filed July 1, 1964 2 Sheets-Sheet 1

INVENTOR.
H. FORRESTER WILSON
BY H. Forrester Wilson

July 29, 1969   H. F. WILSON   3,458,681
ELECTRIC ARC WELDING APPARATUS AND METHOD
Filed July 1, 1964   2 Sheets-Sheet 2
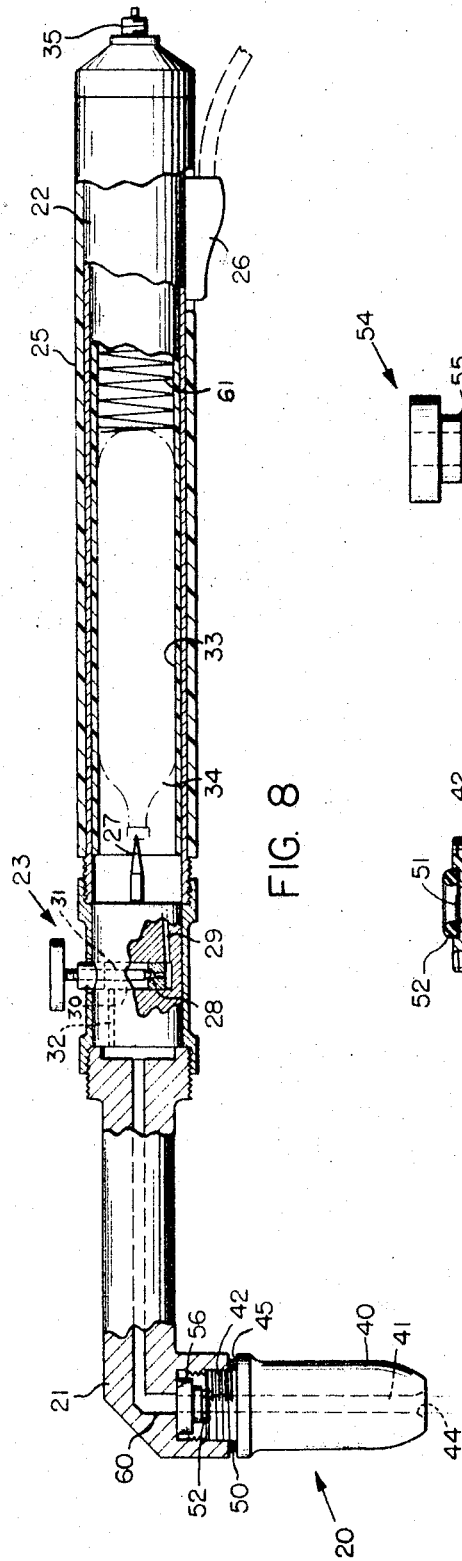
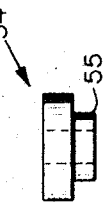
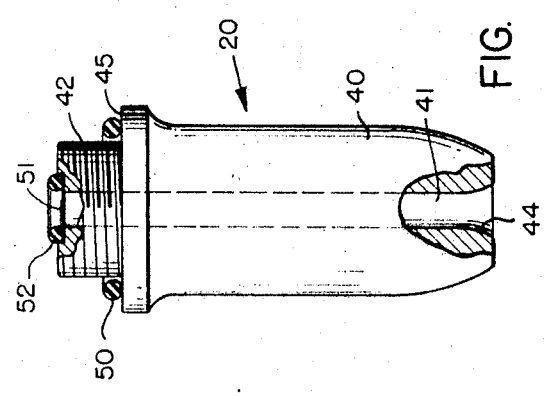
INVENTOR.
H. FORRESTER WILSON
BY H. Forrester Wilson

United States Patent Office 3,458,681
Patented July 29, 1969

3,458,681
ELECTRIC ARC WELDING APPARATUS AND METHOD
H. Forrester Wilson, 32 Clifton St., Phelps, N.Y. 14532
Filed July 1, 1964, Ser. No. 379,598
Int. Cl. B23k 9/16, 35/38
U.S. Cl. 219—74
11 Claims

ABSTRACT OF THE DISCLOSURE

An arc welding electrode assembly is provided having a solid, elongated, consumable metal electrode. A non-fusible, non-metallic element, preferably made of carbon, is attached to the metal electrode and runs longitudinally along it. One or more gas passages are provided contiguous to, and preferably within, this non-metallic element. An inert shielding gas can be supplied to the weld area through these gas passages in the arc welding process disclosed.

This invention relates to a novel electric arc welding apparatus and method, and more particularly, to novel apparatus and method employing a novel welding rod electrode having a longitudinal gas passage along its side.

It is known in arc welding to employ an inert gas such as helium or argon to shield the arc when welding with a consumable metal electrode. The inert gas excludes nitrogen and other harmful substances from the weld area and results in a superior weld. However, the apparatus and methods presently used for gas shielded arc welding with metal electrodes have had serious limitations. One drawback of a known apparatus of this type is that it requires a complex mechanism for feeding metal electrode to the vicinity of the nozzle that delivers the shielding gas. The shielding gas, e.g., helium, must be directed into the area of the electric arc, which forms at the end of the electrode or welding rod, thus supplying molten metal to form the weld. As the tip of the electrode melts, the electrode must continuously be fed toward the area of the weld. A conventional apparatus employs for this purpose a large, heavy reel of flexible welding rod with complex means for delivering rod continuously from the reel to the weld area at the rate at which the rod is consumed.

I have now developed a novel welding rod by means of which gas shielded arc welding can be performed with simpler and lighter equipment than required conventionally.

In general, the novel device of the invention comprises an elongated electrically-conducting metal welding rod having along at least one side thereof a continuous gas passage extending longitudinally along said metal rod. The most outstanding advantages of the invention are obtained with the embodiment thereof in which the gas passage is contiguous or, preferably, formed entirely within a non-fusible, non-metallic layer attached longitudinally to the metal rod. Several important advantages are obtained when this non-metallic layer consists essentially of electrically conducting carbon. In another embodiment, the apparatus of the invention comprises the novel welding rod assembly in combination with an electrode holder having a gas passage communicating with the gas passage of the electrode assembly and with a source of inert gas, the latter being a valve-controlled, portable gas container carried by the electrode holder, or a separate source of gas connected by a conduit to the gas passage of the electrode holder. Still further, the invention extends to the method of arc welding which comprises forming an electric arc between a metallic work surfaces and a consumable metallic electrode having a longitudinal layer of electrode carbon while directing a stream of inert gas into the area of the arc from a gas passage contiguous with the carbon layer.

The invention will be described in more detail by reference to the drawings of which:

FIG. 8 is a partly sectional view of the electrode assembly and electrode holder.

FIG. 9 is an enlarged view of the electrode holding and sealing means, shown partly in section.

FIG. 10 is an enlarged view of a compression washer used in applying gripping pressure to the electrode assembly.

Figure 1:
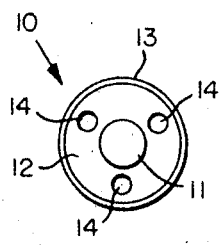
FIG. 1 is an end view of a welding rod of the invention.
Figure 2:
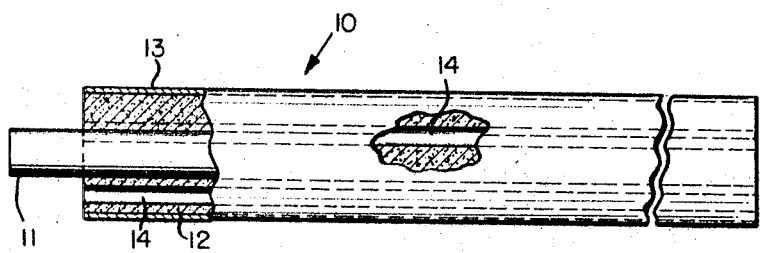
FIG. 2 is a side elevation of the welding rod assembly of this invention, partly in section.

In FIGS. 1 and 2, the welding rod assembly 10 comprises a solid metallic electrode element 11 and an attached non-metallic, thermally dispersible layer 12 having a continuous longitudinal gas passage 14. The metallic element 11 can be an electrically conducting metal suitable for welding, brazing or other operations that employ an electric arc and a consumable metal electrode. The most common materials for the metallic rod will be steel, aluminum and various ferrous alloys of the types needed for welding the particular base metal. In brazing, the rod will be bronze or the like.

The non-metallic layer 12 or rod assembly 10 is preferably composed of electrode grade carbon and is adhered or otherwise attached longitudinally to the metallic element. Advantageously, it can be secured to the metallic element by a wrapping or coating 13 which can be copper, aluminum or other metallic foil or a heat dispersible plastic substance such as polyethylene, or other plastic which can be burned in the weld area without serious adverse effect on the weld. It is also possible to use a thin dispersible wrapping of asbestos, which can have advantages in temperature control in the welding operation.

Extending from one end to the other of non-metallic layer 12 is the longitudinal gas passage 14, which is adapted to deliver a stream of inert gas from a gas container to the welding end of rod assembly 10. It will be seen that in the preferred embodiment of FIG. 2, the non-metallic layer does not extend all the way to the end of the metallic rod 11. It is slightly shorter so that the inert gas will be delivered to the weld area from a short distance away from the arc. The reason for this is to avoid blowing gas into the weld area at a velocity that would blow the molten metal out of the weld.

Electrode grade carbon offers the greatest advantages as the material for the non-metallic layer. In the first place, its use makes it possible to employ the welding rods intermittently as in tack welding. The carbon does not fuse when heated, then solidify when cooled and close the gas channel when the arc is broken, as can happen with fusible metallic substances. For the same reason, any other non-metallic substances used for this layer should also be non-fusible for successful intermittent use. The carbon also has an important advantage electrically when used as the non-metallic layer. It produces an arc of very high temperature. Accordingly, high temperatures that previously were obtained only with carbon arc welding can now be obtained in our type of consumable metal rod welding. This makes it possible to use the consumable rod technique for welding metals of high melting point.

The fact that unusually high arc temperatures can be obtained with our novel electrode makes possible a further embodiment of our invention, namely, an electrode assembly consising essentially of the elongated metal rod and the longitudinally attached carbon electrode having no gas passage. This type of electrode assembly can be used without a shielding gas, and as a result of the carbon portion of the rod, one obtains welding temperatures higher than normally obtainable with metal electrodes. If the shielding gas is not used, some form of flux should be used to shield the weld. This can be any of the conventional solid fluxes such as manganese silicate or solid carbon dioxide which can be supplied to the weld area, for example, as a granular powder from a hopper or as an annular coating molded on the welding rod.

The exact composition and dimensions of the non-metallic layer can be varied to produce a composition having a proper burning rate relative to the rate of consumption of the metallic element. As previously indicated, the exit end of the gas passage should be spaced a short distance from the tip of the metallic electrode. In the initial operation of the welding rod, this is accomplished simply by making the non-metallic element slightly shorter than the metallic element, e.g., $\frac{1}{16}$ to $\frac{1}{4}$ inch shorter. Then, as the rod is consumed, this difference in lengths of the two elements should remain substantially constant.

The composition of the carbon or other material forming the non-metallic layer or coating and the thickness of the layer are selected to provide a layer that will burn back or otherwise be consumed at about the same rate as the metallic element of the rod, so that the gas exit end of the non-metallic layer remains a short distance from the end of the metallic element.

Figure 3:
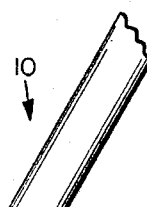
FIG. 3 is an enlarged, perspective view of the welding end of the electrode in use, shown partly in section.

This principle is illustrated by FIG. 3 which is an enlarged view showing the arc end of the welding rod in use. An arc is struck by touching the work 15 with the tip of the metallic element 11, then holding the latter a short distance from the work as shown in FIG. 3, so that the arc 16 melts the tip of rod 11 and the work in the weld area. The carbon layer 12 and its gas passage 14 extend to within a short distance of the end of rod assembly 10 and deliver a screen of shielding gas 17 to the weld area.

In a preferred embodiment the non-metallic, non-fusible layer is electrode-grade carbon which is molded as a coating or shell surrounding the ferrous metallic rod and is of such thickness and shape relative to the thickness and shape of the metallic rod in cross section that the carbon burns at a slightly faster rate than the ferrous electrode melts: the rate being controlled by the thickness of the carbon and the voltage applied to the electrode assembly. The limiting factor is the resistance value of the ferrous electrode as it is undesirable to attain such high temperatures as to burn off the ferrous electrode. This can happen if the carbon is too thick. The principle is to achieve a somewhat higher temperature than is normal with a ferrous electrode covered with a flux or shielded by an inert gas while avoiding excessive temperature. This is accomplished by routine testing to determine the carbon thickness that will provide the desired temperature for the metal being welded at the voltage employed.

Figure 4:
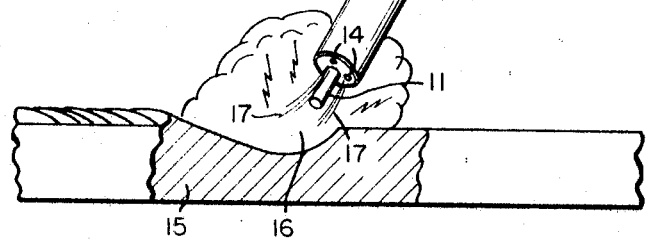
FIGS. 4–7 are cross sections of various configurations of the welding rod assembly.
Figure 4:
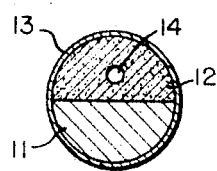
Figure 5:
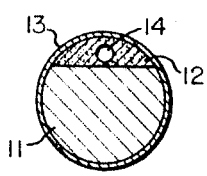
Figure 6:
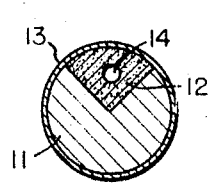
Figure 7:
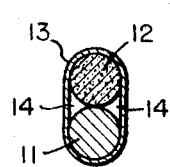

FIGS. 1 and 2 show the embodiment of the electrode assembly in which the metallic element is a cylindrical rod and the non-metallic layer is an annular layer surrounding the metallic rod. This embodiment produces best results but other configurations of the two elements are feasible. Examples of several modifications are shown by FIGS. 4 through 7, each showing a cross section of the rod assembly comprising a metallic rod 11, a non-metallic layer, shell or coating 12, a gas channel 14, and a thin heat-dispersible wrapping or coating 13 which can be metallic, e.g., copper, or non-metallic, e.g., polyethylene. In FIGS. 4–6, the cross section of the total rod assembly is circular, and this shape offers the greatest advantages, especially with respect to electrical characteristics and ease of attachment to the electrode holder and inert gas supply means. However, the principles of the invention also extend to structures of non-circular cross section as in FIG. 7. The latter embodiment also illustrates that the gas channel need not be entirely within the non-metallic layer but can be adjacent to and contiguous with it and enclosed by the thin outer wrapping or coating or otherwise longitudinally associated with the rod assembly. In this arrangement, the fact that the carbon or other non-fusible substance does not melt will aid in preventing blockage of the gas channel even though one side of the channel is in contact with the metallic rod.

FIG. 8 is a partially sectional side view of an embodiment of the novel electrode holder and electrode assembly. This combination comprises the electrode assembly 10, one end of which is connected to rod engaging and sealing means 20. The latter is connected to a gas conduit comprising elbow 21, valve assembly 23, and main cylinder 22, the latter enclosing a portable gas supply means 34. Cylinder 22 is jacketed with electrical insulation 25 which serves as a hand grip means. An electrical terminal 26 at the end of cylinder 22 is provided for attachment of the electrical conductor to a welding machine which can comprise an AC, DC or reverse polarity generator to provide current passing through the cylinder 22, valve assembly 23, elbow 21 and holder 20 to the electrode assembly 10.

Electrode engaging and sealing means 20 is shown in enlarged detail in FIG. 9. It comprises a generally tubular body portion 40 having an electrode receiving and gas conducting passage 41 extending from a threaded end 42 to the rod receiving end 44. Preferably, the passage 41 has an outwardly flared section 44 which facilitates introduction and removal of the welding rod assembly. At the base of the threaded portion 42, the tubular body portion 40 has an annular shoulder 45 which provides a seat for a resilient sealing ring 50. In addition, the gas passage 41 at the threaded end of means 20 is provided with a recess that forms a shoulder 51 that provides a seat for a smaller resilient sealing ring 52.

Associated with the electrode engaging and sealing means 20 in its threaded connection with elbow 21 is a compression washer 54 having a raised inner section 55 of outside diameter preferably the same as that of the sealing ring 52.

In use, the threaded end of electrode engaging means 20 is fitted with the resilient sealing rings 50 and 52, composed, e.g., of natural or synthetic rubber, the washer 54 is placed on seat 56 of elbow 21, the raised section 55 being directed away from seat 56 and the means 20 is partially threaded into the elbow 21. An electrode assembly 10 is inserted into the rod receiving end 44 of electrode holder 20 and is pushed in until it is engaged by O-ring or annular sealing means 52. Normally the end of the rod will extend into the hole of washer 54 or even into the enlarged gas passage 60 of elbow 21. When the end of electrode assembly 10 is in contact with ring 52, the threaded connection of holder 20 in elbow 21 is tightened to compress the O-ring 52 against portion 55 of washer 54, thus causing the resilient ring to grip tightly the surface of electrode 10, holding it in place and forming a gas seal against the passage of gas through passage 41 except through passages 14 of electrode 10. The larger O-ring 50 forms a further seal as the threaded connection of 20 and 21 is tightened.

The electrode holding and sealing means 20 with its associated sealing means and compression washer provides a valuable means for quick engagement of the electrode assembly with the electrode holder, providing a firm grip and a gas seal in a convenient manner. Spent rods can be quickly replaced by new rods simply by twisting means 20 to release the compression on O-ring 52 and allowing the withdrawal of the rod assembly 10.

FIG. 8 shows an embodiment in which cylinder 22 carries a small portable gas cartridge 34. The latter is conveniently held in a plastic sleeve or liner 33, e.g., of Teflon, and is urged by spring 61 against a corrugated or ribbed puncturing means 27 carried by valve assembly 23. The inert shielding gas, e.g., helium, under elevated pressure from cartridge 34 is then available for passage through valve assembly 23 to the elbow 21.

Valve assembly 23 comprises a gas inlet passage 29, communicating with a vertical passage 30, having a valve seat 28 and valve stem 31, the latter functioning in known manner to close or open the gas passage leading to gas outlet passage 32.

Valve assembly 23 is threadably or integrally connected to elbow 21 and cylinder 22 by any suitable gas-tight connection. Its outlet gas passage 32 communicates with gas passage 60 of elbow 21. Passage 60 in turn communicates with the gas passages of 14 of rod assembly 10 as the rod is engaged by the electrode holding means 20.

By the means described, the shielding gas can be delivered continuously or intermittently from cartridge 34, as controlled by valve 23 to the gas passages of the electrode and through such passages to the tip of the rod and into the weld area.

The electrode holder can also be provided with a valve 35, e.g., at the hand grip end or any other convenient location. This valve can be a conventional valve of type found on pneumatic tires, with a threaded surface for connection to a flexible gas line from a large gas pressure vessel such as a cylinder of helium. When the electrode holder is used in this manner, the portable cartridge 34 is normally removed from cylinder 22 and the gas employed in the welding operation is introduced by valve 35.

FIG. 3 illustrates schematically the appearance of the welding end of the apparatus of the invention when in use. The voltage is applied to the electrode holder by way of terminal 26 in known manner. Valve 23 is opened to allow helium to issue from the gas passages of electrode assembly 10. An arc is struck between the work 15, and the metal rod 11, thereafter holding the tip of rod 11 a short distance from the work. The intense heat of arc 16 melts the base metal of work 15 and the metal rod 11. Harmful gases are excluded from the weld area by the stream of helium 17, thus producing a weld of high quality.

Although I have described the invention in its use of consumable metal electrodes that are held stationary in the electrode holder, the principles of the invention, based on the use of a carbon electrode in combination with a metal electrode, extend also to apparatus in which the metal electrode is fed continuously or intermittently toward the work. For example, the metal rod can be fed from a reel through an annular carbon electrode.

I have described the invention with reference to specific embodiments, but it is to be understood that the invention is not limited to the embodiments shown but can be used in other ways without departing from its spirit, as defined by the appended claims.

I claim:

1. A consumable arc welding electrode assembly comprising an elongated, solid, metal welding rod, an elongated non-fusible, non-metallic element attached longitudinally to said metal welding rod, and at least one continuous gas passage contiguous with said non-metallic element and extending longitudinally along said assembly.

2. A welding rod assembly according to claim 1 in which said non-metallic element is carbon.

3. A welding rod assembly according to claim 2 in which at least one gas passage is located within the carbon element.

4. A consumable metal welding rod arc welding electrode assembly comprising an elongated generally cylindrical metal welding rod having attached thereto an elongated annular carbon electrode, the metal rod extending a short distance beyond the annular carbon electrode at the welding end of the electrode assembly, said carbon electrode having at least one longitudinal gas passage extending its entire length parallel to the metal rod, and said carbon electrode having an outer wrapping.

5. An assembly according to claim 4 in which the carbon electrode has a plurality of longitudinal parallel gas passages.

6. An assembly according to claim 4 in which the outer wrapping is copper foil.

7. The welding electrode assembly of claim 1 in which the metal welding rod is selected from the group consisting of steel and ferrous alloys.

8. The welding electrode assembly of claim 7 in which the non-metallic element is carbon.

9. An assembly according to claim 4 in which the outer wrapping is selected from the group consisting of a metallic foil, a heat dispersible plastic substance which can be burned in the weld area without serious adverse effect on the weld, and asbestos.

10. A method of arc welding which comprises forming an electric arc between a metallic work surface and a consumable, solid, metallic electrode having an elongated, non-fusible, non-metallic element longitudinally attached thereto, and directing a stream of inert gas into the area of the arc from a gas passage contiguous with the non-metallic element.

11. The method of claim 10 in which the non-metallic element is carbon and the metallic electrode is steel or a ferrous alloy.

References Cited

UNITED STATES PATENTS

| | | | |
|---|---|---|---|
| 1,788,310 | 1/1931 | Lebrun et al. | 219—146 |
| 2,462,463 | 2/1949 | Boot | 219—146 |

RICHARD M. WOOD, Primary Examiner

J. G. SMITH, Assistant Examiner

U.S. Cl. X.R.

219—146